F. W. GRAVUNDER.
INSECT GATHERING AND KILLING MACHINE.
APPLICATION FILED JAN. 18, 1917.
1,245,706.
Patented Nov. 6, 1917.
3 SHEETS—SHEET 1.
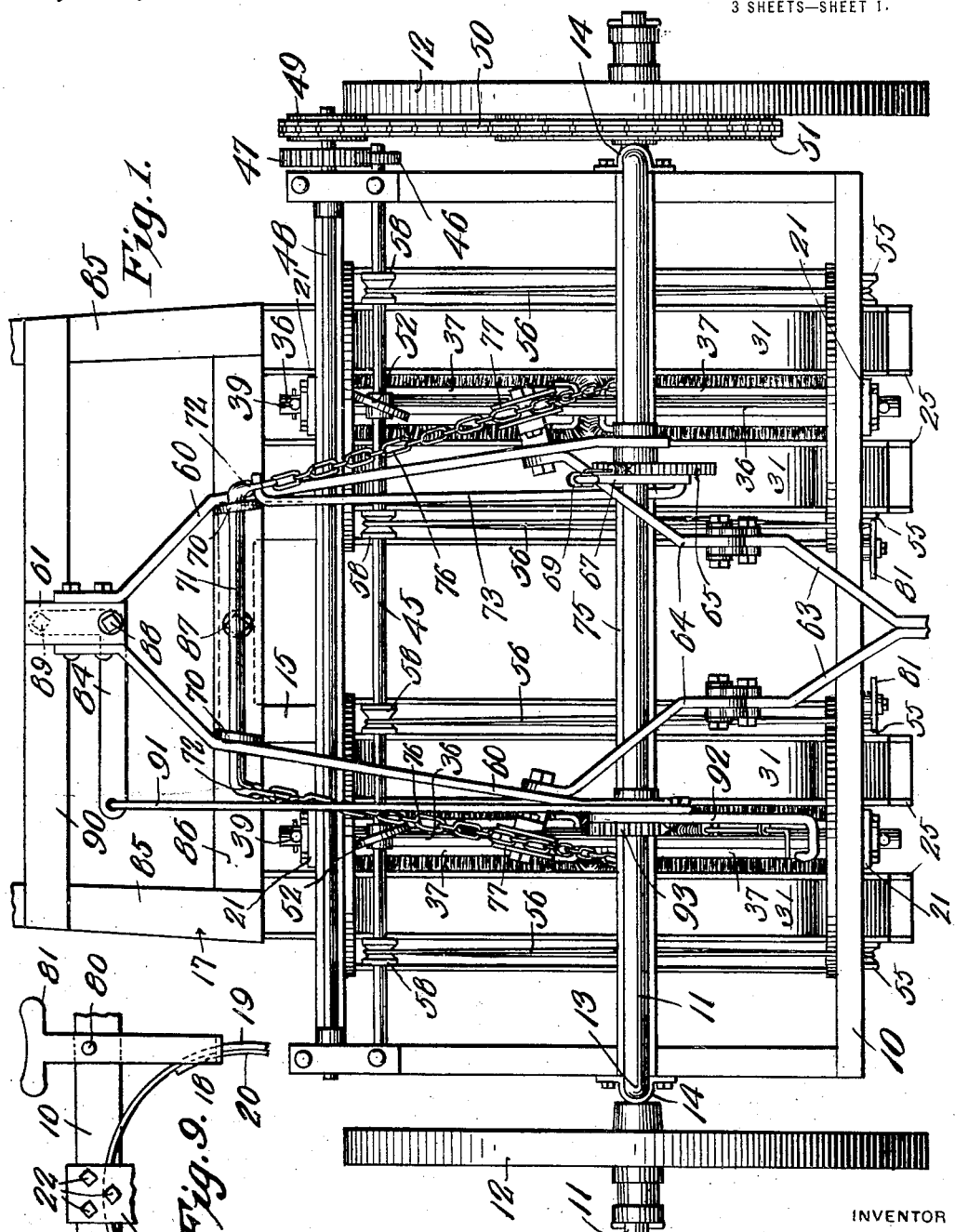
INVENTOR
*Fred W. Gravunder,*
BY *Richard B. Owen.*
ATTORNEY
WITNESSES
*James F. Crown,*

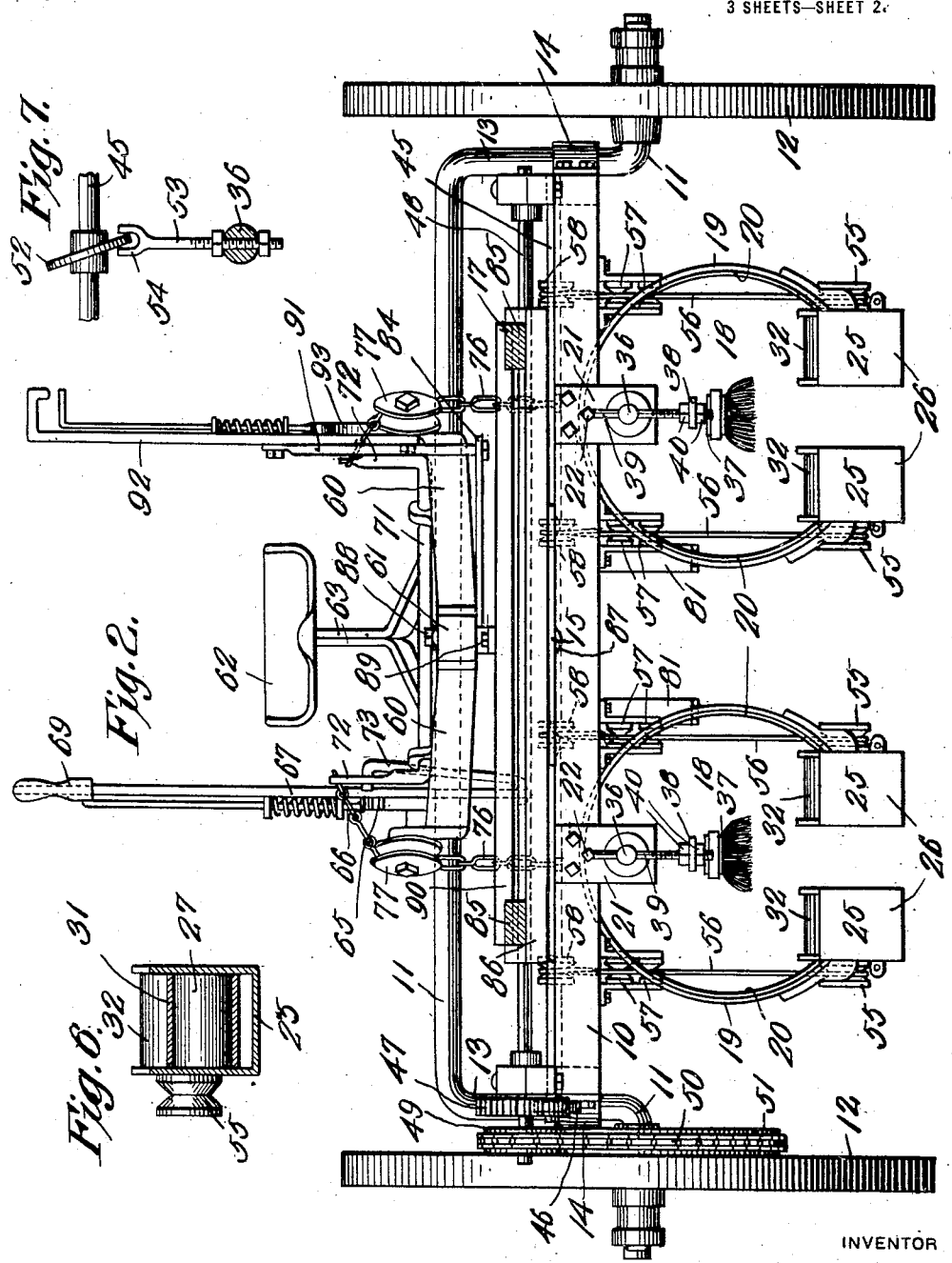

F. W. GRAVUNDER.
INSECT GATHERING AND KILLING MACHINE.
APPLICATION FILED JAN. 18, 1917.
1,245,706.
Patented Nov. 6, 1917.
3 SHEETS—SHEET 3.
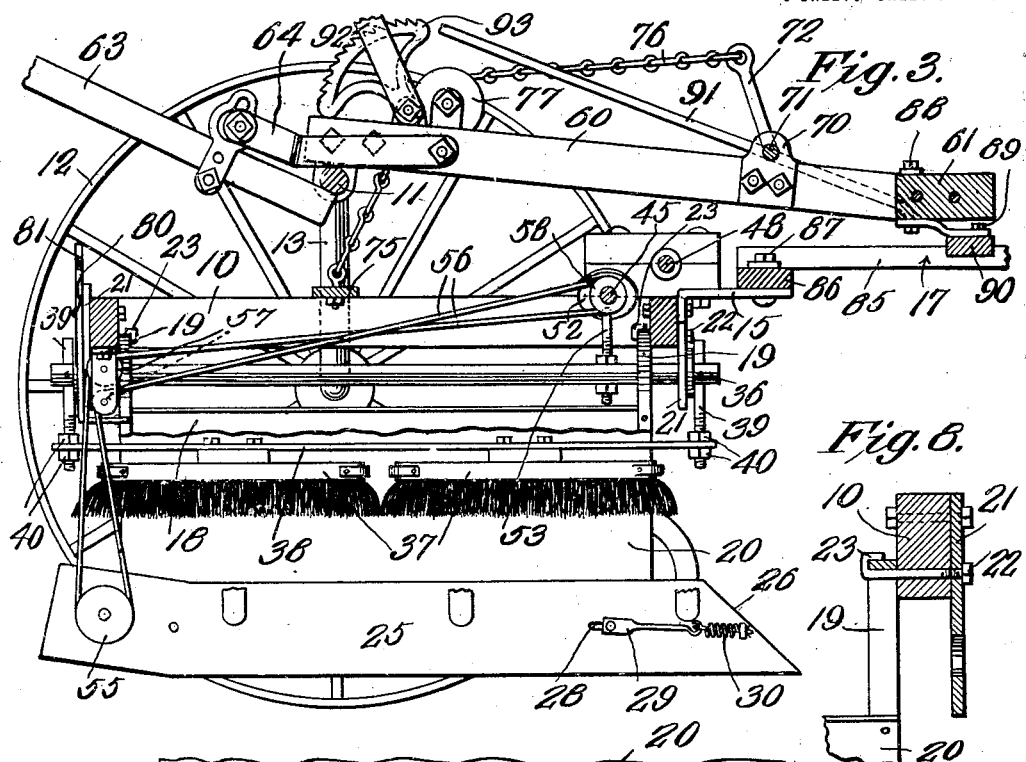
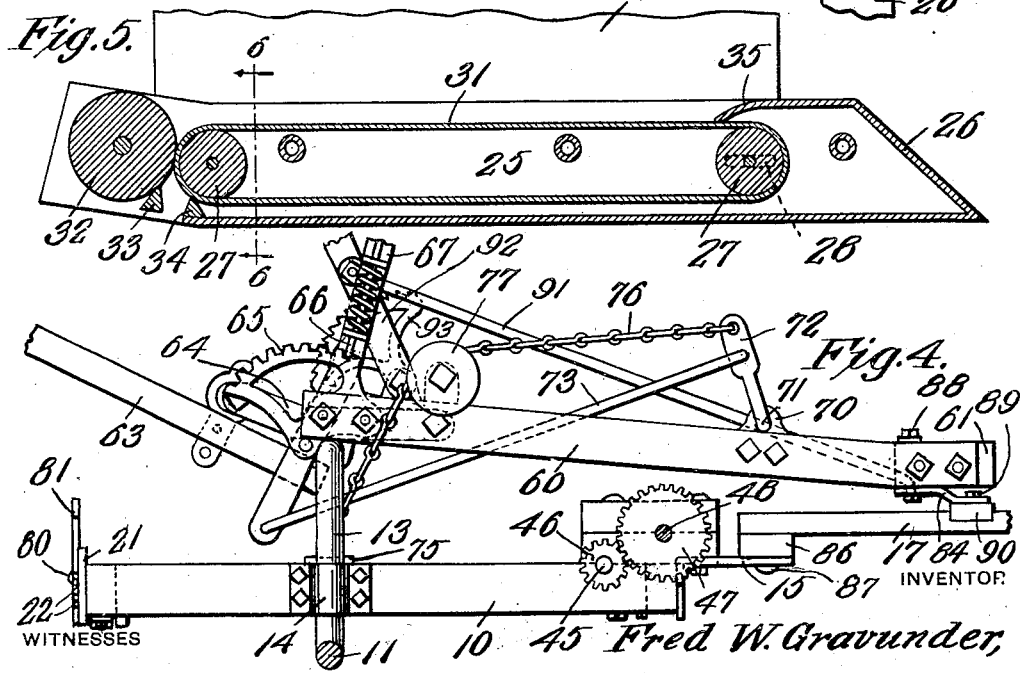
WITNESSES
James F. Crown,
D. D. Galt
INVENTOR
Fred W. Gravunder,
BY Richard B. Owen,
ATTORNEY

UNITED STATES PATENT OFFICE.

FRED W. GRAVUNDER, OF BLOOMER, WISCONSIN.

INSECT GATHERING AND KILLING MACHINE.

1,245,706.     Specification of Letters Patent.     Patented Nov. 6, 1917.

Application filed January 18, 1917. Serial No. 143,114.

*To all whom it may concern:*

Be it known that I, FRED W. GRAVUNDER, a citizen of the United States, residing at Bloomer, in the county of Chippewa and State of Wisconsin, have invented certain new and useful Improvements in Insect Gathering and Killing Machines, of which the following is a specification.

This invention relates to bug exterminators, and is adapted particularly to be used in removing bugs from growing plants and for killing the bugs at one and the same operation.

The primary object of the invention is to provide a machine of this character, which is adapted to be moved adjacent growing plants, such as potato vines, and which is equipped with improved means for removing the bugs from the vines without danger of injury to the plants. A further object is to provide a machine of this character which is so constructed as to preclude the possibility of escape of the insects or bugs after having been removed from the plants. A still further object is to provide a device of this character provided with improved adjusting means, whereby the machine may be used in connection with plants of various sizes without injury to the plants or blossoms thereof.

Still further objects reside in the provision of an exterminating machine of this character which is of simple construction, light of weight, and easy of operation; which is equipped with improved adjusting and controlling means; which has its various parts so constructed and assembled as to minimize the opportunity for wear, breakage or derangement; and which combines simplicity of construction with efficiency.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1 is a top plan view of the exterminator constructed and arranged in accordance with the invention;

Fig. 2 is a front end view of the device, the shafts being shown in section;

Fig. 3 is a central sectional view taken from the rear to the front of the device;

Fig. 4 is a fragmentary view illustrating the operation of the lifting lever;

Fig. 5 is an enlarged longitudinal sectional view taken through one of the insect killing devices;

Fig. 6 is a sectional view taken upon line 6—6 of Fig. 5;

Fig. 7 is a detail sectional view illustrating the means for oscillating the agitators;

Fig. 8 is a sectional view illustrating the manner in which the hoods are attached to the frame; and Fig. 9 is a detail view illustrating the means for controlling lateral movements of the hoods.

Referring now more particularly to the drawings, 10 indicates a rectangular frame, which is supported by and beneath an axle 11, the latter being supported upon wheels 12. It will be observed, particularly with reference to Fig. 2 of the drawings, that the axle is of substantially inverted U-shape, the vertical portions or legs 13 of which are inclosed by travelers 14 secured to the ends of the frame 10. This construction enables the frame 10 to be moved vertically upon the chassis, and means for controlling this movement and for supporting the frame in its adjusted positions will be detailed hereafter.

The frame 10 may be of any desired shape and size, and is preferably constructed of light materials so that the weight of the exterminator in its entirety will permit of its being operated by a single draft animal. Attached to the forward end of the frame as by a yoke 15 are shafts 17, the latter being of the usual well known construction, to permit of an animal being attached thereto to impart movement to the vehicle.

Arranged in spaced relation upon the under side of the frame 10 and extending parallel to each other from the rear and to the front of the frame are hood members 18, the said hood members being adapted to inclose the growing plants during the bug removing operation. These hood members include open rings 19 secured to the front and rear bars of the frame 10, and between each pair of which metallic plates 20 extend. Secured as by suitable bolts to the front and rear bars of the frame 10 and depending therefrom are plates 21, through each of which a bolt 22 extends, and these bolts are hooked as at 23 at their inner ends so as to engage over the adjacent ring 19 of the hoods. By tightening the nuts upon the bolts, the rings may be shifted, or they may be entirely detached from the rim. The side plates 20 of the hoods are curved as shown to conform to the contour of the rings, and prevent the bugs shaken from the plants from passing beyond the sides of the hoods.

The lower edges of the side plates 20 of the hoods terminate in alinement with the open ends of the rings, and secured to each side of each hood at the lower edge thereof is a collector and exterminator indicated generally at 25. These collectors are arranged in parallel relation, and are preferably in the form of elongated rectangular boxes. The forward ends of the boxes protrude beyond the forward ends of the hoods, and are inclined as indicated at 26 so as to lift fallen vines without injuring the same as the vehicle moves. The distance between the collectors of each pair is sufficient to accommodate the stalks or plants with which the machine is to be used. Journaled for rotation within each of the boxes and adjacent the forward and rear ends thereof are rollers 27. The roller at the forward end has its supporting shaft rotatably mounted in an elongated slot 28, so that said roller may be adjusted toward or away from its companion roller. An arm 29 engages one of the protruding ends of the said shaft, and a spring 30 normally exerts pressure upon the arm so as to force the roller 27 away from its companion roller. A conveyer belt 31 passes over the rollers 27 in each of the boxes, and the upper surface of the belt lies substantially near the upper open ends of the boxes.

Journaled for rotation within each box and at the rear thereof is a crushing or killing roller 32. This roller is at all times engaged with the belt 31 passing over the rearmost of the rollers 27, and as bugs, insects, and other vermin are conveyed rearwardly upon the belt 31, the said insects, etc., are cushioned between the rollers 22 and 27. It will also be observed that rotary movement imparted to the crusher roller 32 will operate to drive the belt 31 over its rollers 27. Scrapers 33 and 34 are arranged at the rear end of each conveyer; the former constantly engaging the crusher roller and the latter being constantly in frictional contact with the belt 31, and it is obvious that these scrapers will maintain the crusher and belt free from bugs. It will be observed that the bottom of each box adjacent the scrapers is removed, so that the dead vermin will be dropped to the ground after having been removed from the roller and belt.

Each of the boxes has its upper portion covered for a short distance inwardly from its forward end, and the cover part forms an apron 35 extending downwardly and into contact with the upper portion of the belt 31. This construction prevents sand or dirt being deposited within the boxes to impede the operation of the belt.

Mounted for oscillation in the lower ends of the plates depending from the frame 10 at the front and rear thereof are shafts 36. These shafts extend throughout the length of the frame as is obvious, and are disposed midway between the boxes 25 forming the vermin collecting and killing mechanism. Each shaft carries brushes 37 which are adapted to contact the foliage or stalks of the plants and to agitate the same to jostle vermin therefrom. These brushes extend throughout the length of the hoods and are supported by a common bar 38. This bar is connected at its forward and rear ends to bolts 39 extending downwardly from and carried by the shaft 36. With reference particularly to Fig. 3 of the drawings, it will be observed that the ends of the brush bar are held upon the bolts 39 between lock or jam nuts 40, and it is apparent from this construction that the brushes may be adjusted toward or away from the lower ends of the hoods.

Journaled for rotation adjacent one end of the frame and extending laterally thereof is a jack shaft 45, which has secured to one end a pinion 46. This pinion is in mesh with a gear 47 affixed to a shaft 48, and the shaft 48 carries a sprocket wheel 49, over which passes a sprocket chain 50. This chain also passes over a large sprocket 51 carried by one of the supporting wheels 12 of the vehicle. Means is provided for utilizing the power developed in the shaft 45 for oscillating the brush shafts 36, and to this end, the shaft 45 is provided with a pair of wabble disks 52. One of these disks is positioned directly above each brush shaft 36, and an arm 53 carried by the adjacent brush shaft engages at its upper extremity with the wabble disk. The end of each arm is yoked as at 54, the furcations of the yoke engaging upon opposite faces of the wabble disk.

The journal of each of the crusher rollers 32 carries a belt wheel or pulley 55, over which a belt 56 passes. This belt passes over suitable guide wheels or idlers 57 supported in a bracket depending from the rear end of the frame 10, and the said belt also extends over a pulley 58 affixed to the jack shaft 45.

From the foregoing, it is apparent that as the vehicle advances, the jack shaft 45 will, by reason of the chain and sprocket and intermeshing gear arrangement rotate, and this rotation of the jack shaft will, by means of the wabble disks, cause the brushes 37 to oscillate laterally. The belts 56 will rotate the pulleys 55 on the crusher roller shaft, and the said crusher roller will cause the conveyer belts 31 to operate. As the hoods pass over the growing plants, the brushes 37 will engage the plants and agitate the same, whereupon bugs or insects will be shaken into the hoods, and by reason of the fact that the side plates of the hoods are curved and extend downwardly the bugs will be deposited upon the conveyer 31. As the conveyer travels rearwardly, the bugs will be crushed by the roller 32, and will then be dropped to the ground. Should any of the vines or plants with which the device is to be used be lying upon the ground, the forward ends of the housings or boxes 25 will engage beneath such vines and lift the same, so that the vines are straightened and brought into contact with the oscillating brushes. The particular construction of the boxes and the arrangement of the belt therein, precludes the possibility of injury to the movable parts by sand or dirt. To compensate for plants of different heights, the bar 38 supporting the agitating brushes may be raised or lowered by operation of the nuts 40 on the pendant bolts 39. This particular means for connecting the brushes to the frame also permits of the brushes being readily detached should it be required to clean, repair, or to replace the same.

Arranged upon the vehicle is a superstructure comprising a frame in the form of a yoke 60. This yoke may be formed of metallic bars, converging at their forward ends and being held spaced apart at said ends by a tongue 61. The rear ends of the yoke arms 60 are attached to the upper horizontal portion of the axle, and may be secured to said axle in any preferred manner. A seat for the operator or driver of the machine is indicated at 62, and is attached to the frame by means of the bars 63. These bars 63 extend at their forward ends beneath the axle and are fastened to the yoke by means of links 64, the latter extending across the upper part of the axle.

Secured to one arm of the yoke, and preferably to the right of the driver's seat is a sector 65, over which a pawl 66 carried by a lever 67 plays, the said lever being pivoted as shown to the sector. The latch 66 is controlled by a suitable hand lever 69 at the outer end of the lever 67.

Mounted in suitable bearings 70 supported upon the arms of the yoke 60 adjacent the forward end thereof and disposed transversely of the said yoke is an oscillating bar 71, the extremities of the said bar being turned upwardly to provide arms 72. One of the arms 72 is connected with the lower extremity of the lever 67 by a link or connecting rod 73, so that the bar 71 may be caused to oscillate by rocking of the lever 67.

The frame 10 is provided near its medial portion with a laterally disposed beam 75, to which the ends of chains 76 are connected; the opposite ends of the chain being secured to the upper ends of the arms 72.

From the foregoing, it is apparent that when it is desired to raise or lower the frame 10 and the mechanism supported by the same, it is but necessary to move the lever 67 around its segment. The chains 76 pass over guide pulleys or idlers 77 secured upon the yoke 60, and the frame is capable of sliding vertically upon the upright portions 13 of the axle. In this manner, adjustment of the hoods toward and away from the ground may be accurately and quickly made.

I have also provided means for quickly and easily shifting the hoods laterally, should it be found necessary to so move the hoods to avoid obstructions or to operate upon plants out of proper alinement. Pivoted as at 80 to the rear bar or frame 10 are a pair of foot rests 81. The upper ends of these rests are crotched as shown, to accommodate the feet of the operator seated in the seat 62. The lower ends of the rests extend downwardly and are bent forwardly and bifurcated as shown. The bifurcated portion of the forwardly extending ends of the rests engage with the rings 19 at the rear end of the frame, and by rocking either or both of the foot rests laterally, the movement will be transmitted to the hoods. In this manner, the operator can at all times accurately guide the hoods.

The shafts for attaching a draft animal to the machine are indicated at 85, and the rear cross bar 86 of the shafts is pivoted as at 87 to the central portion of the yoke member 15 projecting forwardly from the frame 10. This arrangement permits of the frame being steered.

A bell crank lever 84 is pivoted as at 88 at its middle portion to the under face of the forwardly projecting tongue 61 at the front end of the yoke, and one extremity of the lever is pivoted as at 89 to a cross bar 90 on the shafts. The opposite end of the lever is connected as by a link 91 to a hand operated lever 92 pivoted to the yoke 60 and preferably upon the left hand side thereof. This lever travels about a sector 93, and may be equipped with a suitable latch for maintaining the lever 92 in its various positions of adjustment.

When it is desired to steer the vehicle, the hand lever 92 is operated, and the pressure upon the forward end of the yoke exerted through the bell crank 84, causes the vehicle frame to swing upon the pivot 87. In this manner the direction of travel of the vehicle may be accurately governed.

From the above description, taken in connection with the drawings, it is apparent that I have provided an extremely simple and yet thoroughly efficient means for removing bugs from plants and for exterminating the insects. It is preferred that the brushes 37 be equipped with bristles or hair of considerable length, to obviate the breakage or crushing of the foliage of the plants operated upon. The device is so constructed as to be capable of minute adjustment and regulation, and will prove positive in its operation and thoroughly efficient in the attainment of the ends set forth.

While the present disclosure is that of what I believe to be the preferred embodiment of the invention, it is to be understood that the invention is not limited thereto, but that various changes may be made in the construction, arrangement, and proportion of parts, without departing from the spirit of the invention, as defined in the appended claims.

What is claimed is:—

1. In a device of the class described, a vehicle, a hood on said vehicle, an insect exterminating mechanism inclosed by said hood, a foot rest pivoted upon said vehicle, the said foot rest being connected to said hood, and the said foot rest being adapted to move said hood laterally.

2. In a device of the class described, a vehicle, a hood on said vehicle capable of moving laterally thereof, a bug exterminating mechanism carried by said hood, a foot lever and a connection between said foot lever and said hood, whereby the latter will be moved when the former is operated.

3. In a device of the class described, a vehicle, a frame on said vehicle, open rings secured in spaced relation upon said frame, plates connecting said rings, bug exterminators secured to the lower portions of said rings and plates, and a foot lever pivoted upon said frame and the said lever being engaged with one of said rings, whereby said rings will be moved laterally upon operation of said lever.

4. In a device of the class described, a vehicle including an axle having vertically disposed portions, a frame, travelers secured to said frame and engaging said vertical portions, a rock shaft on said vehicle, chains connecting said shaft with said frame, and means for rocking said shaft.

5. In an insect killing device, a vehicle including an axle having vertically disposed portions, a frame slidably mounted upon said portions, a rock shaft on said vehicle, arms on said shaft, pulleys secured to said vehicle, chains connecting said arms with said rim, and a lever for rocking said rock shaft.

In testimony whereof I affix my signature in presence of two witnesses.

FRED W. GRAVUNDER.

Witnesses:
T. C. SCHEIDECKER,
THORA H. BRAIN.

Copies of this patent may be obtained for five cents each, by addressing the "Commissioner of Patents, Washington, D. C."